(12) United States Patent
Zhao et al.

(10) Patent No.: US 10,602,111 B2
(45) Date of Patent: Mar. 24, 2020

(54) AUTO WHITE BALANCE CONTROL ALGORITHM BASED UPON FLICKER FREQUENCY DETECTION

(71) Applicant: Apple Inc., Cupertino, CA (US)

(72) Inventors: Yonghui Zhao, San Jose, CA (US); Xuemei Zhang, Mountain View, CA (US); Yingjun Bai, San Jose, CA (US); Gregory Guyomarc'h, San Francisco, CA (US); Kosta Dabov, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/697,228

(22) Filed: Sep. 6, 2017

(65) Prior Publication Data

US 2018/0070068 A1 Mar. 8, 2018

Related U.S. Application Data

(60) Provisional application No. 62/384,106, filed on Sep. 6, 2016.

(51) Int. Cl.
*H04N 9/73* (2006.01)
*H04N 5/232* (2006.01)
(Continued)

(52) U.S. Cl.
CPC ........... *H04N 9/735* (2013.01); *H04N 5/2357* (2013.01); *H04N 5/23212* (2013.01);
(Continued)

(58) Field of Classification Search
CPC ............. H04N 5/23212; H04N 5/2357; H04N 5/3572; H04N 5/367; H04N 9/045; H04N 9/68
See application file for complete search history.

(56) References Cited

U.S. PATENT DOCUMENTS 5,255,077 A 10/1993 Yamazaki et al.
5,751,354 A * 5/1998 Suzuki ............... H04N 5/23212
348/296
(Continued)

FOREIGN PATENT DOCUMENTS

EP 0400606 A2 12/1990
EP 1704727 A1 9/2006
(Continued)

OTHER PUBLICATIONS

Bross et al.; "High Efficiency Video Coding (HEVC) Text Specification Draft 7"; JCTVC-I1003 d6; Joint Collaborative Team on Video Coding; 2012; 17 pages; XP55060259A.
(Continued)

*Primary Examiner* — Nicholas G Giles
(74) *Attorney, Agent, or Firm* — BakerHostetler

(57) ABSTRACT

Techniques for auto white balancing of captured images based on detection of flicker in ambient light is described. When flicker is detected in ambient light during an image capture event, and the flicker is unchanging during the image capture event, a white point of image data may be estimated according to a first technique. When flicker is detected in ambient light during an image capture event, and the flicker is changing during the image capture event, a white point of image data may be estimated according to a second technique. When flicker is not detected, a white point of image data may be estimated according to a third technique. Image data may be color corrected based on the estimated white point.

26 Claims, 6 Drawing Sheets

(51) Int. Cl.
*H04N 5/235* (2006.01)
*H04N 5/357* (2011.01)
*H04N 5/367* (2011.01)
*H04N 9/68* (2006.01)
*H04N 9/04* (2006.01)

(52) U.S. Cl.
CPC .......... *H04N 5/3572* (2013.01); *H04N 5/367* (2013.01); *H04N 9/045* (2013.01); *H04N 9/68* (2013.01)

(56) References Cited

U.S. PATENT DOCUMENTS

| | | | |
|---|---|---|---|
| 8,531,542 | B2 | 9/2013 | Cote et al. |
| 8,922,704 | B2 | 12/2014 | Cote et al. |
| 9,007,484 | B2 | 4/2015 | Zhang et al. |
| 9,105,078 | B2 | 8/2015 | Lim et al. |
| 9,398,205 | B2 | 7/2016 | Cote et al. |
| 9,710,896 | B2 | 7/2017 | Lim et al. |
| 9,743,057 | B2 | 8/2017 | Cote et al. |
| 10,230,898 | B2 | 3/2019 | Cohen et al. |
| 10,356,332 | B2 | 7/2019 | Cohen et al. |
| 2003/0071919 | A1 | 4/2003 | Braun |
| 2003/0125566 | A1 | 7/2003 | Braun |
| 2005/0174442 | A1* | 8/2005 | Yuyama ............... H04N 5/2357 348/226.1 |
| 2008/0252749 | A1 | 10/2008 | Fujiwara |
| 2012/0194689 | A1* | 8/2012 | Kodama ............... H04N 5/2351 348/220.1 |
| 2015/0172529 | A1* | 6/2015 | Aota ................... H04N 5/2357 348/228.1 |
| 2015/0249842 | A1 | 9/2015 | Norkin |
| 2016/0344992 | A1* | 11/2016 | D'Alfonso ......... A61B 1/00006 |
| 2017/0034494 | A1* | 2/2017 | Kang .................. H04N 5/2357 |

FOREIGN PATENT DOCUMENTS

| | | |
|---|---|---|
| EP | 2916547 A1 | 9/2015 |
| WO | WO 2005/069638 A1 | 7/2005 |
| WO | WO 2014/008212 A1 | 1/2014 |

OTHER PUBLICATIONS

Bross et al.; "High Efficiency Video Coding (HEVC) Text Specification Draft 7"; JCTVC-I1003 d6; Joint Collaborative Team on Video Coding; 2012; 261 pages; cont. of XP55060259A.

Norkin et al.; "HEVC Deblocking Filter"; IEEE Transactions on Circuits and Systems for Video Technology; vol. 22 Issue 12; Dec. 2012; p. 1746-1754.

International Patent Application No. PCT/US2017/051107; Int'l Search Report and the Written Opinion; dated Jan. 4, 2018; 16 pages.

* cited by examiner

100

300

500

700

AUTO WHITE BALANCE CONTROL ALGORITHM BASED UPON FLICKER FREQUENCY DETECTION

CROSS REFERENCE TO RELATED APPLICATIONS

This application claims benefit under 35 U.S.C. § 119(e) of Provisional U.S. Patent Application No. 62/384,106, filed Sep. 6, 2016, the contents of which is incorporated herein by reference in its entirety.

BACKGROUND

Auto White Balance (AWB) is the process of removing unrealistic color casts from captured images, so that objects that appear white when viewed directly by a human viewer are rendered white in the corrected images. Human vision system has the ability to adapt to changes in illumination in order to maintain the appearance of object colors, which is also called chromatic adaption. Digital cameras that perform AWB estimate the color property of an illuminant (a light source), similar to the chromatic adaptation of human vision system. The digital camera may alter captured image data based on the estimate of the illuminant to correct color artifacts that arise due to the illuminant color. Essentially, the AWB algorithms attempt to null out color casts that are imposed in the image due to the illuminant color, which would generate an image reflecting the image content's appearance, as seen by human vision system.

Estimation of the illuminant's characteristics from the camera's response can be difficult because it represents the integral of spectral distribution of the illuminant, reflectance of the object and camera spectral sensitivities. Derivation of illuminant characteristics from the camera response is challenging because the object colors and illuminant colors are mixed together. The inventors perceive a need in the art for a technique that better estimates characteristics of an illuminant in order to perform white balance corrections.

DETAILED DESCRIPTION

Unlike natural daylight, electrically powered light sources (tungsten, fluorescent, LED or halogen, etc.) are subject to flicker. It is caused mostly by AC components of the lights' power supplies. Typically, the frequency of the flickering is either equal to the mains frequency [50 or 60 Hz] or double the mains frequency. Thus the determination of whether an ambient light source possesses flicker or not can lead to classification of the light source into one of two categories: natural daylight or artificial light.

Figure 1:
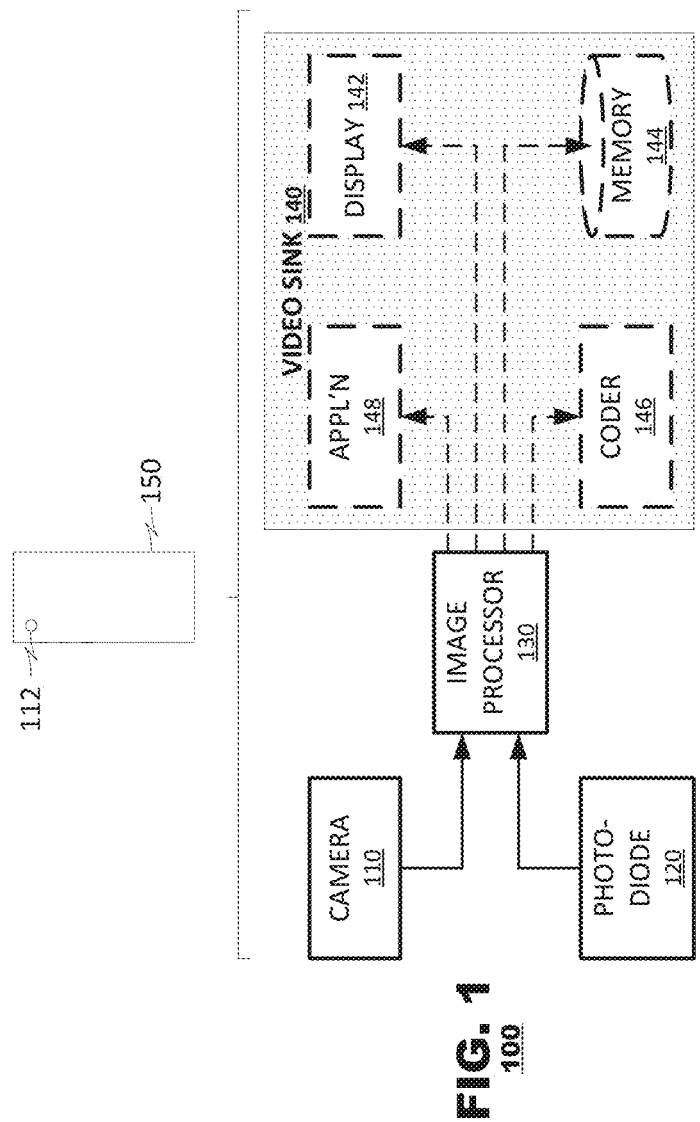
FIG. 1 is a block diagram of an imaging system according to an embodiment of the present disclosure.

FIG. 1 is a block diagram of an imaging system 100 according to an embodiment of the present disclosure. The system 100 may include a camera 110 that captures image data representing a local environment; a photodiode 120 that measures characteristics of ambient light; and an image processor 130 that performs AWB on image data provided by the camera 110.

The camera 110 may generate image data that has image artifacts created by the color of an ambient illuminant.

The photodiode 120 may generate an output signal representing characteristics of illuminant(s) that are present during image capture. For example, the photodiode's output signal may be a time-varying signal having a magnitude and frequency that varies with the intensity and frequency of the illuminants.

The image processor 130 may estimate characteristics of the illuminant from the photodiode's output and from the image data. The image processor 130 may output color corrected image data to other component(s) of the system 100, shown as a video sink 140 in FIG. 1. For example, the color correct image data may be output to a display 142, may be stored in memory 144, may be output to an image coder 146 for compression, or may be output to an application 148 that operates within a device within which the system 100 operates.

In an embodiment, the camera 110, photodiode 120 and image processor 130 may be provided within a processing device 150, such as a smartphone, a tablet computer, a laptop computer, a desktop computer, a portable media player or the like.

Figure 2:
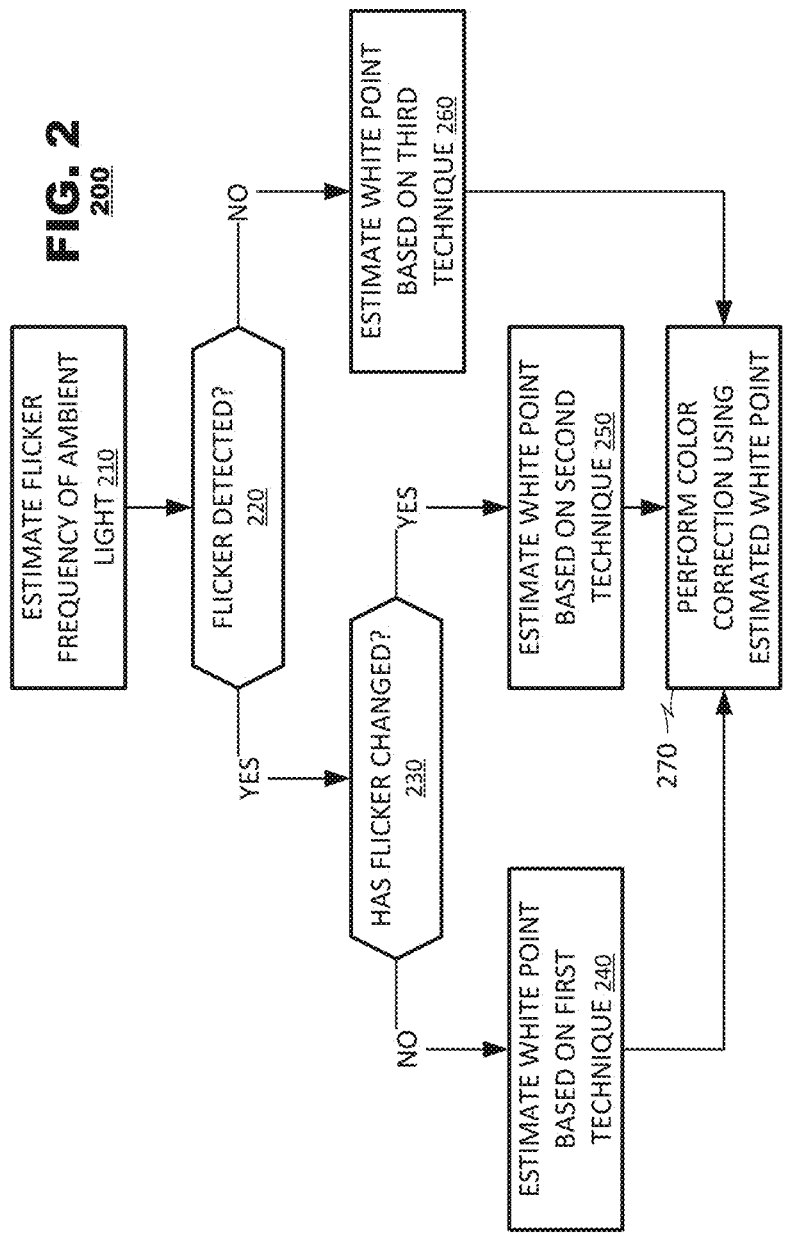
FIG. 2 illustrates a method according to an embodiment of the present disclosure.

FIG. 2 illustrates a method 200 according to an embodiment of the present disclosure. The method 200 may begin by estimating a flicker frequency of ambient light during image capture (box 210), determining whether flicker was detected (box 220) and, if so, determining whether characteristics of the detected flicker have changed (box 230). In box 230, the method 200 may examine characteristics of the flicker's frequency and the temporal waveform of the detected flicker to determine whether they are changing or not. There are several possible outcomes of these determinations.

In one outcome, a flicker is detected and characteristics of the detected flicker are not changing. In this event, the method 200 may estimate a white point of image data that were output from the camera 110 using a first technique (box 240). The first technique may exploit the stable nature of the ambient illuminant, thus making the white point estimation more stable and more resistant to change due to the scene change. For example, many AWB techniques have some difficulty to separate the change from the illuminant and the change from the surface colors in image data. Based upon the analysis of the light flicker and temporal waveform, it allows the AWB process to distinguish image data changes that arise due to the illuminant from image data changes that arise due to scene composition. When the ambient light is stable, more surface colors from the past frames could be contributed to the ambient light estimation.

Another outcome can arise when flicker is detected and it also is changing. In this event, the method 200 may estimate a white point of the image data that were output from the camera 110 using a second technique (box 250). The second technique could be a standard AWB algorithm, e.g., gray-world, color-by-correlation.

In another outcome, no flicker is detected. In this event, the method 200 may estimate a white point of image data using a third technique (box 260), which exploits characteristics of the ambient illuminant (e.g., natural or filtered daylight).

Once the white point of image data is estimated according to one of the foregoing techniques (boxes 240, 250, or 260), the method may perform color correction of image data using the estimated white point as normalization factor for correction (box 270). Thus, any image data may be corrected by the white point, i.e., the camera responses [e.g., red, green and blue] are normalized channel-wise by the color of the illuminant.

Operation of the method 200 may repeat in multiple iterations while a camera 110 (FIG. 1) is operational. During such time, ambient lighting conditions may change, which may cause the detected flicker to vary between one or more stable conditions (box 240 or 260) to the unknown condition (box 250) and perhaps back to a stable condition (box 240 or 260). Thus, it is possible that the method will estimate white points according to multiple, perhaps even all of the techniques of boxes 240, 250, and 260 during a camera event as determined by recurring flicker detection results (boxes 210-230), which may be performed, for example, as lighting conditions change while a camera operates.

Estimation of flicker (boxes 210-230) may be performed using output data from a photodiode 120 (FIG. 1).

Estimation of white points in boxes 240-260 may be performed using image data output by the camera. In such an embodiment, the method 200 may create histograms of color information contained in image data output by the camera 110. The camera 110 may output image data organized as frames at a given frame rate (say 60 fps); the method 200 may create histograms of color information for each of the frames output by the camera. When the method estimates white points according to the techniques of boxes 240-260, it may develop estimates of the white point from histogram data developed from those frames.

In an embodiment, the first technique (box 240) may estimate white point data from a first history of histogram data that is developed over a prolonged sequence of frames, for example, for as long as the flicker does not change or for a predetermined number of frames (assuming the flicker does not change in the predetermined number of frames). By contrast, the second technique (box 250) may estimate white point data from a second history, for example, a histogram of a single frame. The first history may be longer than the second history, so the first history may be referred to herein as the "long" history, and the second history may be referred to as the "short" history.

In many applications, a camera's frame rate may be an operational parameter that may be configured during camera operation. Similarly, the length of the long and short histories described above also may be configurable operational parameters. In one embodiment, a long history may include the cumulative color histogram contributed from a larger number of frames and the short history may include the cumulative color histogram from a small number of frames that correspond to a shorter time span. System designers may tailor the definition of the long and short histories to suit their needs when putting the method 200 of FIG. 2 into practice.

It is expected that the white point estimation process of box 240 will be performed in imaging conditions that involve the mains-powered illuminants, such as indoor lighting. For example, flicker from fluorescent light sources typically occurs at 100 Hz or 120 Hz.

It is expected that the white point estimation process of box 260 will be performed in imaging conditions that involve natural daylights, such as outdoor light sources (e.g., direct or diffuse sunlight). Such illuminants do not exhibit flicker.

White point estimation may be performed by traditional techniques. Typically, the white point estimation is done on 2-dimensional chromatic histogram space where one of the dimensions is color temperature for blackbody light sources or correlated color temperature for non-blackbody light sources. For example, the white point estimation process may be performed according to any of the techniques described in the inventors' prior patent filings, U.S. Publ'n No. 2013-0093915, U.S. Pat. Nos. 8,780,225, 9,007,484, and/or 9,030,575.

Figure 3:
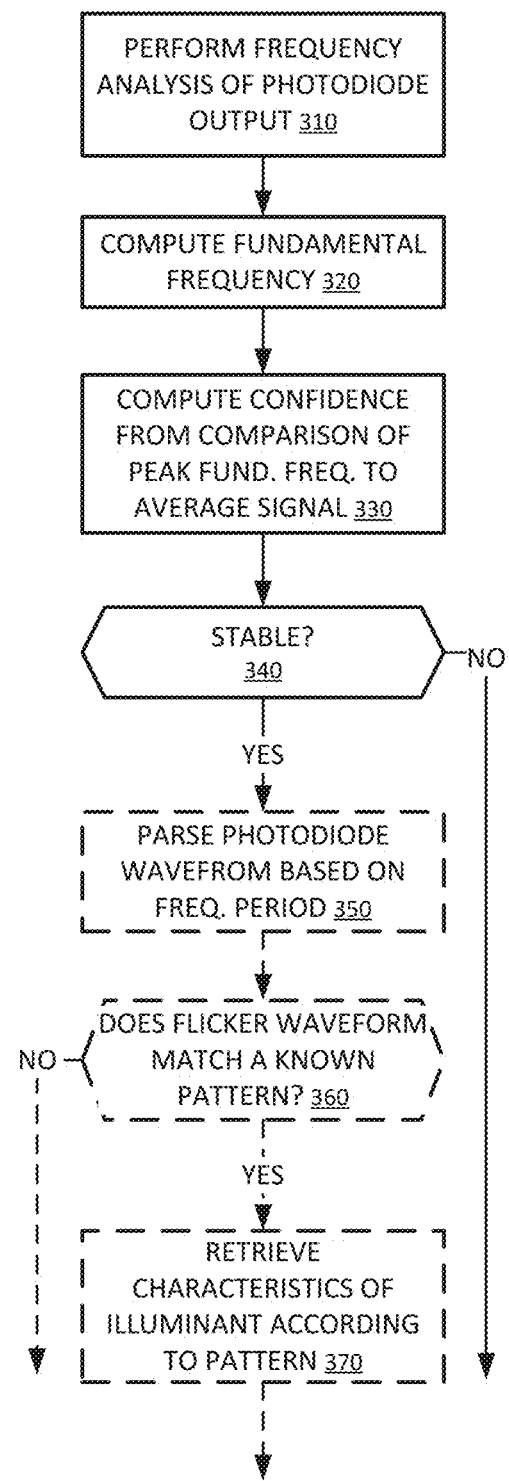
FIG. 3 illustrates a method according to another embodiment of the present disclosure.

FIG. 3 illustrates a method 300 to detect flicker in photodiode output according to an embodiment of the present disclosure. The method 300 may begin by performing a frequency analysis of an output signal from the photodiode (box 310). The frequency analysis may be performed by a fast Fourier transform, for example. The method 300 may detect a fundamental frequency from the photodiode's output (box 320) and mask out harmonics other than the fundamental frequency. The fundamental frequency may be taken as the flicker frequency of the illuminant.

The method 300 also may compute a confidence score of the frequency estimation (box 330). The confidence score may be estimated in a variety of ways. In one embodiment, illustrated in FIG. 3, the confidence score may be estimated from a comparison of the peak value at fundamental frequency to an average value of the signal in other frequencies. The confidence score may be compared to a numeric threshold to determine whether the fundamental frequency should be taken as the flicker frequency (box 340).

In an embodiment, the method 300 may estimate variations in the fundamental frequency over a most recent span of frames (step not shown). It may compare the frequency variation to determine whether the frequency estimation is operating in a stable state. If frequency variations exceed a predetermined limit, the illuminant may be assigned an unstable state.

Also, when a flicker frequency is detected, analysis of the temporal waveform of the light source permits the current waveform at one time period to be compared with a past waveform, and the matching metric could be indicated whether the waveform is changed or not. When the temporal waveform is not changed with higher matching confidence, the AWB could tight the white-point variation; and relax the variation vice versa.

Optionally, when a flicker frequency is detected, the method 300 may attempt to characterize properties of the illuminant. The method 300 may parse a time-domain representation of the photodiode's output according to the fundamental frequency (box 320) and may determine whether the flicker waveform matches a known pattern (box 360). If so, the method 300 may retrieve characteristics of the illuminant that is associated with the matching pattern (box 370). These characteristics may be factored into the white point estimation (boxes 230, 240 of FIG. 2) in addition to data derived from the camera output.

FIG. 4 illustrates exemplary signals that may be processed according to the method of FIG. 3.

Figure 4A:
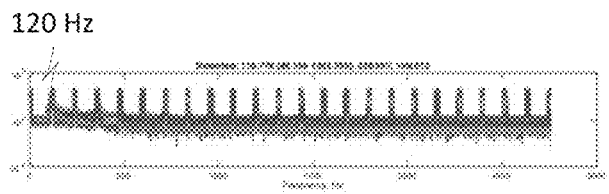
FIGS. 4(a), 4(b), 4(c), 4(d), and 4(e) illustrate exemplary signals that may be processed according to a method of the present disclosure.

FIG. 4(a) illustrates a frequency domain representation of an exemplary photodiode signal. As illustrated, a first fundamental frequency is detected at ~120 Hz and at multiples thereof.

Figure 4B:
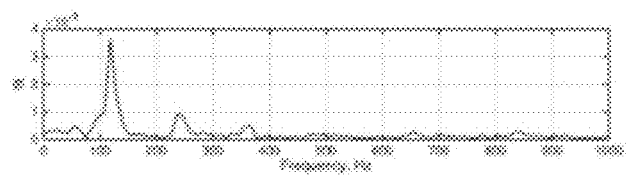

FIG. 4(b) is a graph illustrating a frequency domain representation in linear scale, not logarithm scale as in FIG. 4(a). As illustrated, the first fundamental frequency detected at ~120 Hz is assigned a high value relative to an average value of the signals in other frequencies, thus the detection has higher confidence score.

Figure 4C:
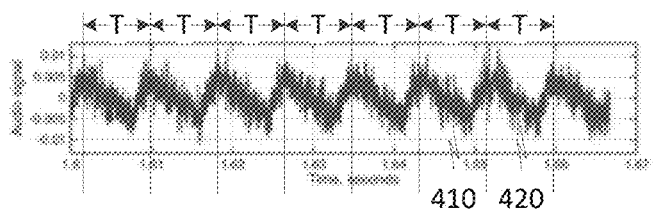
Figure 4D:
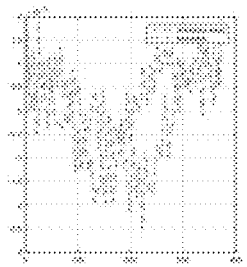
Figure 4E:
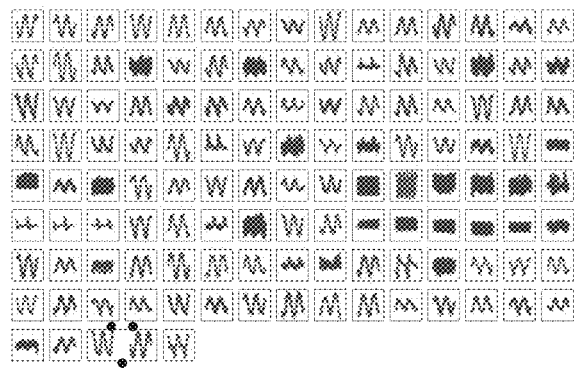

FIG. 4(c) is a graph illustrating a time-domain representation of a photodiode's output, which has been parsed into portions according to a period T associated with the fundamental frequency derived from FIG. 4(a). In example illustrated in FIG. 4(c), the waveform has been partitioned from peak to peak of the photodiode's output but partitioning may occur according to other techniques (based on zero crossings, troughs, etc.).

The method may estimate a shape of the waveform within each period. In one embodiment, a convolution operation may be performed between waveforms 410, 420 in adjacent periods. The waveform of one or N periods (say, 420) may be convolved with the waveform 410 from the other one or N periods. This operation is illustrated schematically in FIG. 4(d).

Pattern matching (box 360, FIG. 3) may be performed by a pattern matching comparison of a waveform obtained from the convolution to a plurality of known waveforms from a pre-measured light source database. The method 300 may be given access to a database storing data representing patterns of known illuminants. Comparisons may be performed, for example, by convolution operations between the illuminant waveform and each of the known patterns. If the comparison generates a match, then the method may retrieve from the database data representing characteristics of the matching illuminant. For example, the database may store data representing a white point and/or color temperature of the illuminant, which may be used in AWB processing.

Of course, in many image capture use cases, it is possible for ambient lighting to be created from several different illuminants, for example, from several different artificial light sources. In such an embodiment, it is possible that the frequency analysis will identify two or more fundamental frequencies that are not multiples of each other. Similarly, it is possible that the pattern matching may match with several stored patterns. In such a case, the characteristics of the matching patterns may be read from the database and used for an initial estimate of a white point value.

Figure 5:
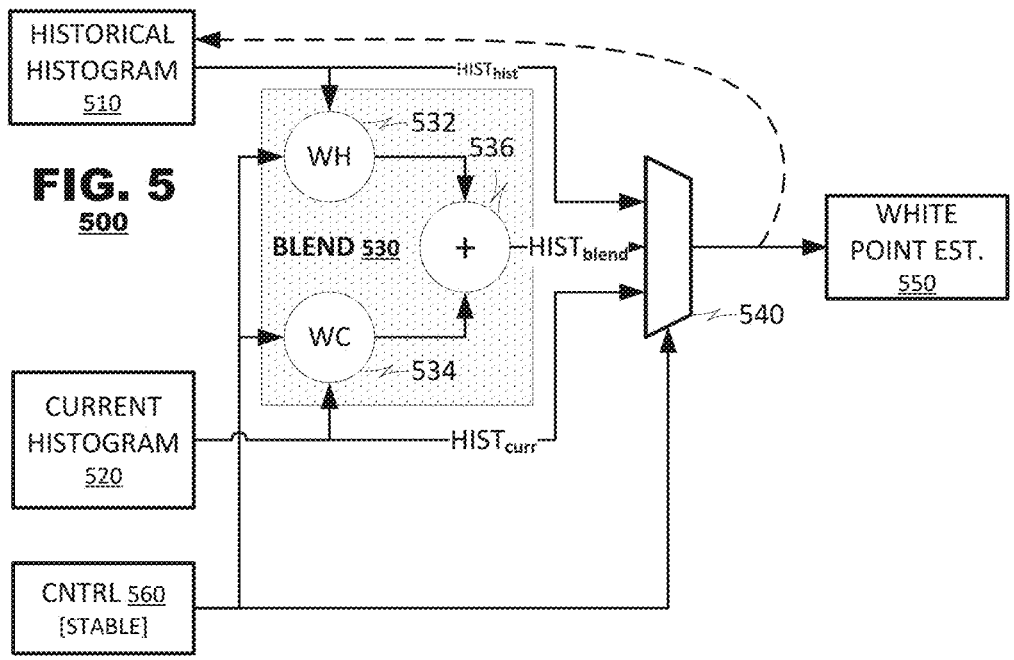
FIG. 5 is a data flow diagram illustrating a white point estimation process according to an embodiment of the present disclosure.

FIG. 5 is a data flow diagram illustrating a white point estimation process 500 according to an embodiment of the present disclosure. The process 500 may rely on two sets of histograms: 1) a historical histogram 510 representing an aggregation of color information developed from preceding frames, and 2) a current histogram 520 representing a histogram of color information for a current frame, the frame that is to be corrected by AWB.

The process may include a blending unit 530, a selector 540, a white point estimator 550, and a controller 560. The blending unit may create a modified histogram from the historical histogram data 510 and the current histogram data 520. The selector 540 may output histogram data to the white point estimator 550 from several sources: the historical histogram data 510 (without alteration), the current histogram data 520 (without alteration), or the blended histogram data 530. The selection may be performed by the controller 560, which may select among the different sources based on an indication of stability of the illuminant.

In an embodiment, the output of the selector 540 also may become the historical histogram data 510 of a next frame (shown in phantom).

The blending unit 530 may include a pair of weighting units 532, 534 and an operator 536. The weighting units 532, 534 may scale contribution of the respective histograms 510, 520 and the operator 536 may combine the scaled histograms 510, 520 together by adding two histograms or picking the maximum value from two histograms pointwise. The weighting units 532, 534 may operate according to weights that are provided by the controller 560.

During operation, during times of high instability, the controller 560 may cause the selector 540 to select data of the current frame's histogram 520 without alteration. The current histogram data 520 would be input to the white point estimator 550 and also become the historical histogram data 510 of a next iteration of operation. In this manner, the current histogram data 520 effectively replaces the historical histogram data 510 in a next iteration. This technique may define the scenario of the light source suddenly change, e.g., light turns on or off, light switching in a light-box, etc.

During times of high stability, the controller 550 may cause the selector 540 to select data of the historical histogram data 510 without alteration. The historical histogram data 510 would be input to the white point estimator 550 and also become the historical histogram data 510 of a next iteration of operation. In this manner, the historical histogram data 510 would not change from iteration to iteration. This technique may define the scenario that the historical histogram data 520 contains all the color data from the current histogram 520, i.e., the current scene or the color data of the current frame has been represented in the historical histogram data 510.

During times of transition, the controller 560 may cause the selector 540 to select data of the blending unit 530. The controller 560 also may set weights for the weighting units 532, 534 based on the type of transitions identified in photodiode output data. For example, when the white point estimated from the current histogram data 520 has higher correlated color temperature (CCT) values than the white point estimated from the historical histogram data 510, then the controller 560 may set the blending unit to scale down the current histogram 520 and combine it with the ambient histogram. Such scaling may occur, for example, as: $HIST_{blend} = \max(\alpha HIST_{curr}, HIST_{hist})$.

Similarly, when the white point estimated from the current histogram data 520 has lower correlated color temperature (CCT) values than the white point estimated from the historical histogram data 510, then the controller 560 may set the blending unit to dilute the historical histogram 510 and mix it with the current histogram 520. Such scaling may occur, for example, as: $HIST_{blend} = \beta HIST_{curr} + (1-\beta) HIST_{hist}$.

The scaling factors may control the convergence speed to adapt to the current frame, and they are calculated based upon the difference between white points estimated from the current 520 and historical histogram data 510.

In the foregoing, $HIST_{curr}$, $HIST_{hist}$, and $HIST_{blend}$ represent the current, historical and blended histograms respectively and the $\alpha$ and $\beta$ are weighting values selected by the controller 560 based on the comparison of the white points estimated from the historical histogram data 510 and the current histogram data 520.

Returning to FIG. 2, when photodiode output is stable and no flicker is observed, white point estimation may be performed based on image brightness (box 260).

Figure 6:
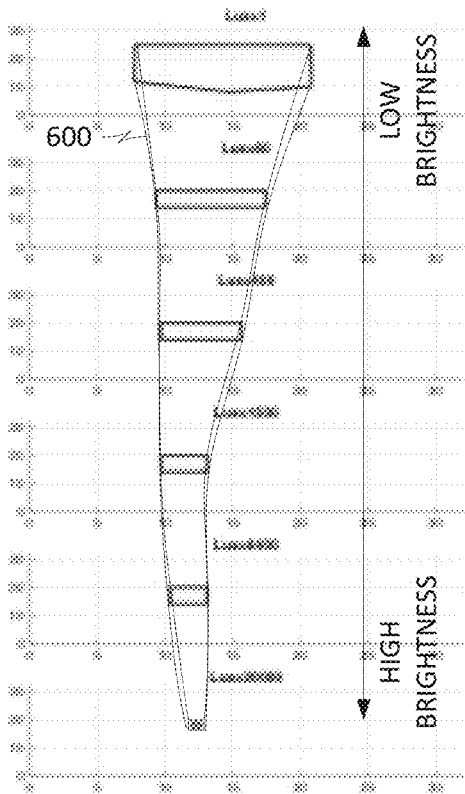
FIG. 6 illustrates application of white point estimation according to an embodiment of the present disclosure.

FIG. 6 illustrates application of white point estimation based on image brightness. FIG. 6 illustrates a three dimensional space of chromaticity values and brightness values. Within this space, for each brightness value, a zone 600 may be defined representing image color values that may be considered as candidate white point values. If the estimated white point is not inside the zone, the white point is projected on the boundary of the zone using different projection method, e.g., minimum distance in the chromatic space. As illustrated, at low brightness levels, a larger zone of color values may be accepted as white point values than at high brightness levels. The zones could be defined for a limited number of brightness values [e.g., six in FIG. 6], and the zone for other brightness value could be interpolated with two neighboring zones using the brightness value as weighing factor. Data defining the zone may be stored within a system and, during operation of the method 200 of FIG. 2, a brightness level of an input image may be derived to determine which zone of color values should be considered as white point candidates. The brightness level may be derived either from the photodiode's output signals or from brightness values derived from image data output by the camera. The zone defines the possible white point candidates for each brightness level, and color balancing may be performed with the white-point constrained by the zone.

Use of white-point zone definition 600 such as illustrated in FIG. 6 is expected to constrain the white point search space to natural or filtered daylight and further limit opportunities for false correction in an AWB algorithm where an illuminant would be mistakenly confused as low CCT light with dominant yellow surface colors, or greenish light with dominant green grass or foliage colors. Incorrect color correction could cause image content have some unwanted color cast in such circumstances.

Figure 7:
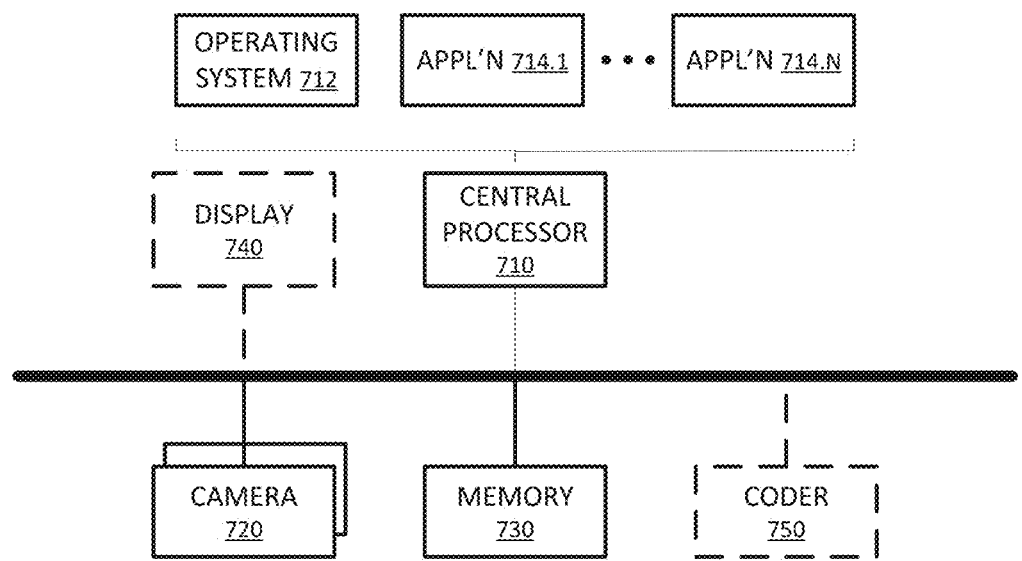
FIG. 7 illustrates an exemplary computer system suitable for use with the embodiments of the present disclosure.

In an embodiment, the techniques described herein may be performed by a central processor of a computer system. FIG. 7 illustrates an exemplary computer system 700 that may perform such techniques. The computer system 700 may include a central processor 710, one or more cameras 720, and a memory 730 provided in communication with one another. The camera 720 may perform image capture and may store captured image data in the memory 730. Optionally, the device also may include sink components, such as a display 740 and a coder 750, as desired.

The central processor 710 may read and execute various program instructions stored in the memory 730 that define an operating system 712 of the system 700 and various applications 714.1-714.N. The program instructions may perform AWB control and flicker detection according to the techniques described herein. As it executes those program instructions, the central processor 710 may read, from the memory 730, image data created by the camera 720, and it may perform flicker detection, white point estimation and AWB control as described hereinabove.

As indicated, the memory 730 may store program instructions that, when executed, cause the processor to perform the techniques described hereinabove. The memory 730 may store the program instructions on electrical-, magnetic- and/or optically-based storage media.

The image processor 130 (FIG. 1) and the central processor 710 (FIG. 7) may be provided in a variety of implementations. They can be embodied in integrated circuits, such as application specific integrated circuits, field programmable gate arrays, digital signal processors and/or general purpose processors.

Several embodiments of the disclosure are specifically illustrated and/or described herein. However, it will be appreciated that the teachings of this the disclosure may find application in other implementations without departing from the spirit and intended scope of the disclosure.

We claim:

1. A method, comprising:
   detecting flicker of ambient light during an image capture event;
   determining whether the flicker is changing during the image capture event;
   when flicker is detected and is unchanging, estimating a white point of image data according to a first technique based on a history of frames of a first length;
   when flicker is detected and is changing, estimating the white point of image data according to a second technique based on a history of frame(s) of a second length shorter than the first length;
   when flicker is not detected, estimating the white point of image data according to a third technique; and
   color correcting the image data based on the estimated white point.

2. The method of claim 1, wherein the third technique includes:
   estimating the white point of image data according to a white point search technique based on a natural or filtered daylight search space.

3. The method of claim 1, wherein the determining whether flicker is changing includes estimating a fundamental frequency of the ambient light.

4. The method of claim 1, wherein the determining whether flicker is changing includes comparing a characteristic of the ambient light to characteristics of known illuminants.

5. The method of claim 1, wherein the first, second and third techniques include estimating the white point from a histogram of color data developed from a history of previous frames.

6. The method of claim 1, wherein the first, second and third techniques include estimating the white point from a histogram of color data developed from a current frame.

7. The method of claim 1, further comprising for the first technique:
   estimating the white point from a histogram of color data developed from a history of previous frames; and
   estimating the white point from a histogram of color data developed from a current frame;
   when the flicker is detected and unchanging, determining whether the white point estimated from the current frame's histogram has higher correlated color temperature values than the white point estimated from the historical histogram data, and
   wherein, when the white point estimated from the current frame's histogram and has higher correlated color temperature values than the white point estimated from the historical histogram data, the first technique includes scaling the current histogram data, combining the scaled histogram data with the historical histogram data, and estimating the white point from the combined data.

8. The method of claim 1, further comprising for the first technique:
   estimating the white point from a histogram of color data developed from a history of previous frames; and
   estimating the white point from a histogram of color data developed from a current frame;
   when the flicker is detected and unchanging, determining whether the white point estimated from the current frame's histogram has higher correlated color temperature values than the white point estimated from the historical histogram data, and
   wherein, when the white point estimated from the current frame's histogram and has higher correlated color temperature values than the white point estimated from the historical histogram data, the first technique includes blending the current histogram data with the historical histogram data, and estimating the white point from the blended data.

9. Apparatus, comprising:
a camera,
an ambient lighting detector, and
an image processor to:
  detect flicker of ambient light from output of the ambient lighting detector;
  determine whether the flicker is changing during a capture event of the camera;
  when flicker is detected and is unchanging, estimate a white point of image data from the camera according to a first technique based on a history of frames of a first length;
  when flicker is detected and is changing, estimate the white point of the image data according to a second technique based on a history of frame(s) of a second length shorter than the first length;
  when flicker is not detected, estimate the white point of the image data according to a third technique; and
  color correct the image data based on the estimated white point.

10. The apparatus of claim 9, wherein, for the third technique, the image processor estimates the white point of image data according to a white point search technique based on a natural or filtered daylight search space.

11. The apparatus of claim 9, wherein the image processor estimates a fundamental frequency of the ambient light as part of the determination whether flicker is changing.

12. The apparatus of claim 9, wherein the image processor compares a characteristic of the ambient light to characteristics of known illuminants as part of the determination whether flicker is changing.

13. The apparatus of claim 9, further comprising a memory to store data representing histograms of color data for use in the first, second and third techniques.

14. The apparatus of claim 9, wherein the first, second and third techniques include estimating the white point from a histogram of color data developed from a history of previous frames.

15. The apparatus of claim 9, wherein the first, second and third techniques include estimating the white point from a histogram of color data developed from a current frame.

16. The apparatus of claim 9, wherein the image processor for the first technique further:
  estimates the white point from a histogram of color data developed from a history of previous frames; and
  estimates the white point from a histogram of color data developed from a current frame;
  when the flicker is detected and unchanging, determines whether the white point estimated from the current frame's histogram has higher correlated color temperature values than the white point estimated from the historical histogram data, and
  wherein, when the white point estimated from the current frame's histogram and has higher correlated color temperature values than the white point estimated from the historical histogram data, the first technique includes scaling the current histogram data, combining the scaled histogram data with the historical histogram data, and estimating the white point from the combined data.

17. The apparatus of claim 9, wherein the image processor for the first technique further:
  estimates the white point from a histogram of color data developed from a history of previous frames; and
  estimates the white point from a histogram of color data developed from a current frame;
  when the flicker is detected and unchanging, determines whether the white point estimated from the current frame's histogram has higher correlated color temperature values than the white point estimated from the historical histogram data, and
  wherein, when the white point estimated from the current frame's histogram and has higher correlated color temperature values than the white point estimated from the historical histogram data, the first technique includes blending the current histogram data with the historical histogram data, and estimating the white point from the blended data.

18. Computer readable storage device storing program instructions that, when executed by a processing device, causes the device to:
  detect flicker of ambient light during an image capture event;
  determine whether the flicker is changing during the image capture event;
  when flicker is detected and is unchanging, estimate a white point of image data according to a first technique based on a history of frames of a first length;
  when flicker is detected and is changing, estimate the white point of image data according to a second technique based on a history of frame(s) of a second length shorter than the first length;
  when flicker is not detected, estimate the white point of image data according to a third technique; and
  color correct the image data based on the estimated white point.

19. The storage device of claim 18, wherein the program instructions for the third technique cause the processing device to: estimate the white point of image data according to a white point search technique based on natural or filtered daylight search space.

20. The storage device of claim 18, wherein the determination whether flicker is changing includes estimating a fundamental frequency of the ambient light.

21. The storage device of claim 18, wherein the determination whether flicker is changing includes comparing a characteristic of the ambient light to characteristics of known illuminants.

22. The storage device of claim 18, wherein the first, second and third techniques include estimating the white point from a histogram of color data developed from a history of previous frames.

23. The storage device of claim 18, wherein the first, second and third techniques include estimating the white point from a histogram of color data developed from a current frame.

24. The storage device of claim 18, wherein the program instructions for the first technique further cause the processing device to:
  estimate the white point from a histogram of color data developed from a history of previous frames; and
  estimate the white point from a histogram of color data developed from a current frame;
  when the flicker is detected and unchanging, determine whether the white point estimated from the current frame's histogram has higher correlated color temperature values than the white point estimated from the historical histogram data, and wherein, when the white point estimated from the current frame's histogram and has higher correlated color temperature values than the white point estimated from the historical histogram data, the first technique includes scaling the current histogram data, combining the scaled histogram data with the historical histogram data, and estimating the white point from the combined data.

25. The storage device of claim 18, wherein the program instruction for the first technique further cause the processing device to:
   estimate the white point from a histogram of color data developed from a history of previous frames; and
   estimate the white point from a histogram of color data developed from a current frame;
   when the flicker is detected and unchanging, determine whether the white point estimated from the current frame's histogram has higher correlated color temperature values than the white point estimated from the historical histogram data, and
   wherein, when the white point estimated from the current frame's histogram and has higher correlated color temperature values than the white point estimated from the historical histogram data, the first technique includes blending the current histogram data with the historical histogram data, and estimating the white point from the blended data.

26. A method, comprising:
   detecting flicker of ambient light during an image capture event;
   determining whether the flicker is changing during the image capture event;
   when flicker is detected and is unchanging, estimating a white point of image data according to a first technique including
      estimating a first white point from of color data developed from a history of previous frames,
      estimating a second white point from a current frame,
      determining whether the first white point has higher correlated color temperature values than the second white point, and
      estimating the white point based on the determined higher correlation; and
   color correcting the image data based on the estimated white point.

* * * * *